United States Patent [19]

Berta

[11] Patent Number: 5,200,144

[45] Date of Patent: Apr. 6, 1993

[54] SIMULATED NUCLEAR REACTOR FUEL ASSEMBLY

[75] Inventor: Victor T. Berta, Idaho Falls, Id.

[73] Assignee: The United States of America as represented by the United States Department of Energy, Washington, D.C.

[21] Appl. No.: 864,717

[22] Filed: Jun. 22, 1992

[51] Int. Cl.$^5$ ............................................. G21C 17/00
[52] U.S. Cl. .......................... 376/463; 976/DIG. 208; 434/218
[58] Field of Search ............... 376/463, 247, 259, 245, 376/277; 976/DIG. 208; 434/218; 219/10.57

[56] References Cited

U.S. PATENT DOCUMENTS

| | | | |
|---|---|---|---|
| 3,666,869 | 5/1972 | Orecchia | 376/463 |
| 3,912,908 | 10/1975 | Clark et al. | 376/463 |
| 3,988,565 | 10/1976 | Hill | 376/463 |
| 4,326,122 | 4/1982 | McCulloch et al. | 376/463 |
| 5,098,641 | 3/1992 | Shiraishi et al. | 376/245 |

Primary Examiner—Daniel D. Wasil
Attorney, Agent, or Firm—Mark P. Dvorscak; Robert J. Fisher; William R. Moser

[57] ABSTRACT

An apparatus for electrically simulating a nuclear reactor fuel assembly. It includes a heater assembly having a top end and a bottom end and a plurality of concentric heater tubes having electrical circuitry connected to a power source, and radially spaced from each other. An outer target tube and an inner target tube is concentric with the heater tubes and with each other, and the outer target tube surrounds and is radially spaced from the heater tubes. The inner target tube is surrounded by and radially spaced from the heater tubes and outer target tube. The top of the assembly is generally open to allow for the electrical power connection to the heater tubes, and the bottom of the assembly includes means for completing the electrical circuitry in the heater tubes to provide electrical resistance heating to simulate the power profile in a nuclear reactor. The embedded conductor elements in each heater tube is split into two halves for a substantial portion of its length and provided with electrical isolation such that each half of the conductor is joined at one end and is not joined at the other end.

4 Claims, 5 Drawing Sheets

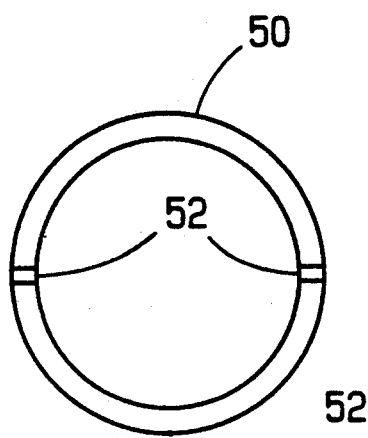
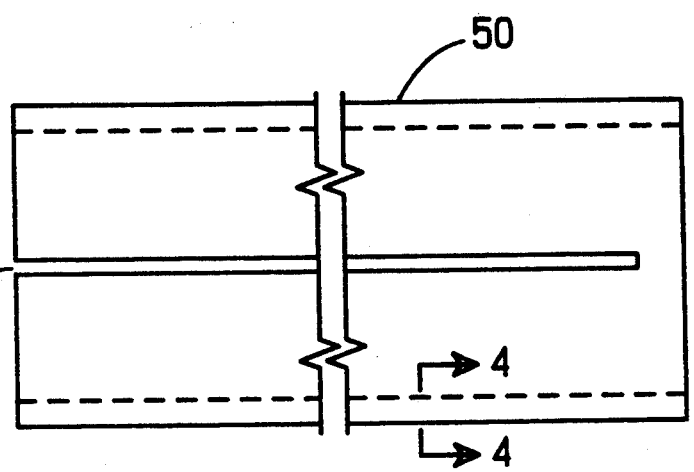
FIG. 3a    FIG. 3b
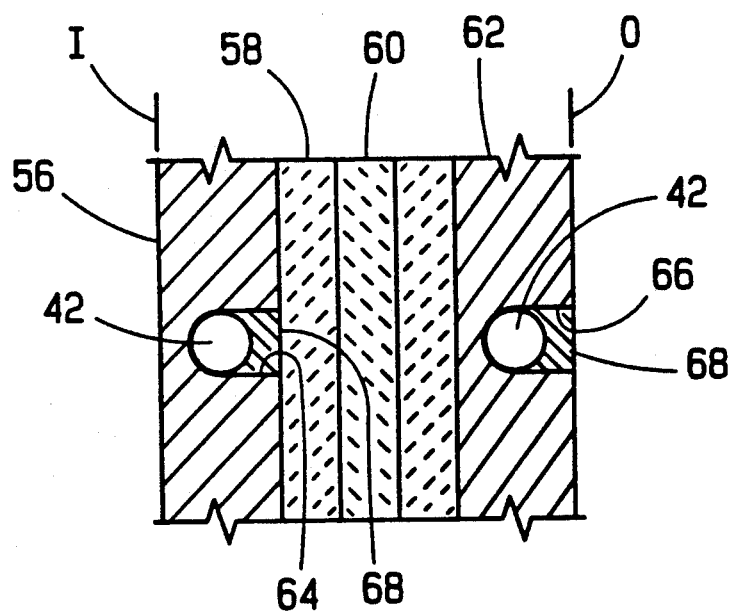
FIG. 4

SIMULATED NUCLEAR REACTOR FUEL ASSEMBLY

CONTRACTUAL ORIGIN OF THE INVENTION

The U.S. Government has rights in this invention pursuant to Contract No. DE-AC07-76ID01570 between the U.S. Department of Energy and EG&G Idaho, Inc.

BACKGROUND OF THE INVENTION

The present invention relates generally to electrical simulators of nuclear fuel assemblies, and more particularly to a heater element design for electrically-powered heater assemblies having concentric fuel tubes.

The heating produced in nuclear fuel assemblies can be simulated in theory by electrically powered assemblies which are designed to represent all or part of an actual fuel assembly. Current machining technology has been successfully applied in the construction of cylindrical rod heater elements for simulation of nuclear fuel rods. However, for other nuclear fuel assembly geometries, such as the concentric cylindrical fuel tubes in the Savannah River Laboratory (SRL) production reactors, current machining technology cannot be used to build electrically powered cylindrical heater tube elements. A major reason is the small thicknesses of the components in a cylindrical heater tube which do not have the material structural strength to withstand machining. Additionally, the design of cylindrical heater elements using only MONEL (Trademark of a nickel-copper alloy and a nontypical nuclear material) and based on current machining technology requires power leads to enter and exit from both ends of the cylindrical heater element. Such designs also contain mechanical components associated with the power leads that perturb the coolant flow at the entrance and exit of the electrically powered simulators.

The need for electrical powered simulators of the production reactor fuel assemblies originates from studies on the safety aspects of these reactors. In accident conditions, such as the loss-of-coolant accident from a failure (break) in a primary reactor coolant system component, the loss of coolant that removes the nuclear generated heat from the core causes the fuel assemblies to go into a sustained heatup. If coolant is not restored the core heatup will result in fuel melting temperatures being reached which is the initial phase of what is termed a "servere reactor accident" in which fuel damage and release of radioactivity occurs. In order to prevent such severe accidents from occurring, or as a minimum reducing the probability of such an accident to a low value (1 in $10^6$), accident recovery systems and operator procedures must be developed that would contain or limit the fuel temperatures in accident conditions to the non-damage region. The successful development of systems and procedures depends in part on experimental data obtained from experiments simulating the accident conditions. Understanding the physics involved provides the means to design the methods to limit the fuel temperatures to non-damage values. Thus, the need for accurate simulation of the fuel assemblies with electrically powered simulators becomes apparent. Without very good experimental data the analysis of such accident conditions in the reactors in the reactors is entirely theoretical. Theoretical analyses alone are not sufficient to obtain licensing to operate nuclear plants.

Accordingly, it is an object of the present invention to provide a nuclear fuel assembly electrical simulator having a full scale cross-section with power leads connected only at the top of the simulator.

A further object of the present invention is to provide a simulated nuclear reactor heater assembly which provides prototypical fuel assembly entrance and exit geometry.

Yet another object of the present invention is to provide a simulated nuclear reactor heater assembly with preservation of fuel assembly surface materials that transfer heat to the coolant.

SUMMARY OF THE INVENTION

This invention provides an apparatus for electrically simulating a nuclear reactor fuel assembly. It includes a heater assembly having a top end and a bottom end and including a plurality of concentric heater tubes having electrical circuitry connected to power leads. The heater tubes are radially spaced from each other. An outer target tube (unheated) and an inner target tube (unheated) is concentric with the heater tubes and with each other, and the outer target tube surrounds and is radially spaced from the heater tubes. The inner target tube is surrounded by and radially spaced from the heater tubes and outer target tube. The top of the assembly in generally open and allows for the electrical power leads to be routed into the assembly interior to the inner target tube. The bottom of the assembly is generally open and includes means for completing the electrical circuitry, connecting all of the heater tubes in a series resistance circuit. The electrical resistance in each heater tube is mechanically designed to provide electrical heat with the same power profile as in a nuclear reactor.

The heater tubes are aluminum. Each heater tube is connected to the power source by an embedded layer of an electrical conductor along the length of the tube. The conductor layer is surrounded by first and second ceramic insulating layers. The inner aluminum layer is a machined tube defined as the "base" tube. The ceramic insulating layers, the conductor layer, and the outer aluminum layer are all thermal sprayed in succession onto the base tube to form the electrical simulator tube.

Each heater tube electrical conductor layer consists of two semicircular elements which are isolated from each other by an electrical insulating ceramic extending substantially along the entire length of the tube but not the full length thereof, such that each tube is joined at one end and is not joined at the other end.

Each heater tube also includes a multiplicity of thermocouples embedded at various locations within the heater tubes.

BRIEF DESCRIPTION OF THE DRAWINGS

The above-mentioned and other features of the invention will become more apparent and be best understood, together with the description, by reference to the accompanying drawings, in which.

FIG. 3a and FIG. 3b show a detailed view of the design of a representative heater tube electrical conductor element embodied in the fuel assembly of the present invention;

FIG. 4 shows a cross-sectional view of the typical heater tube of FIG. 3;

DETAILED DESCRIPTION OF THE INVENTION

Figure 1:
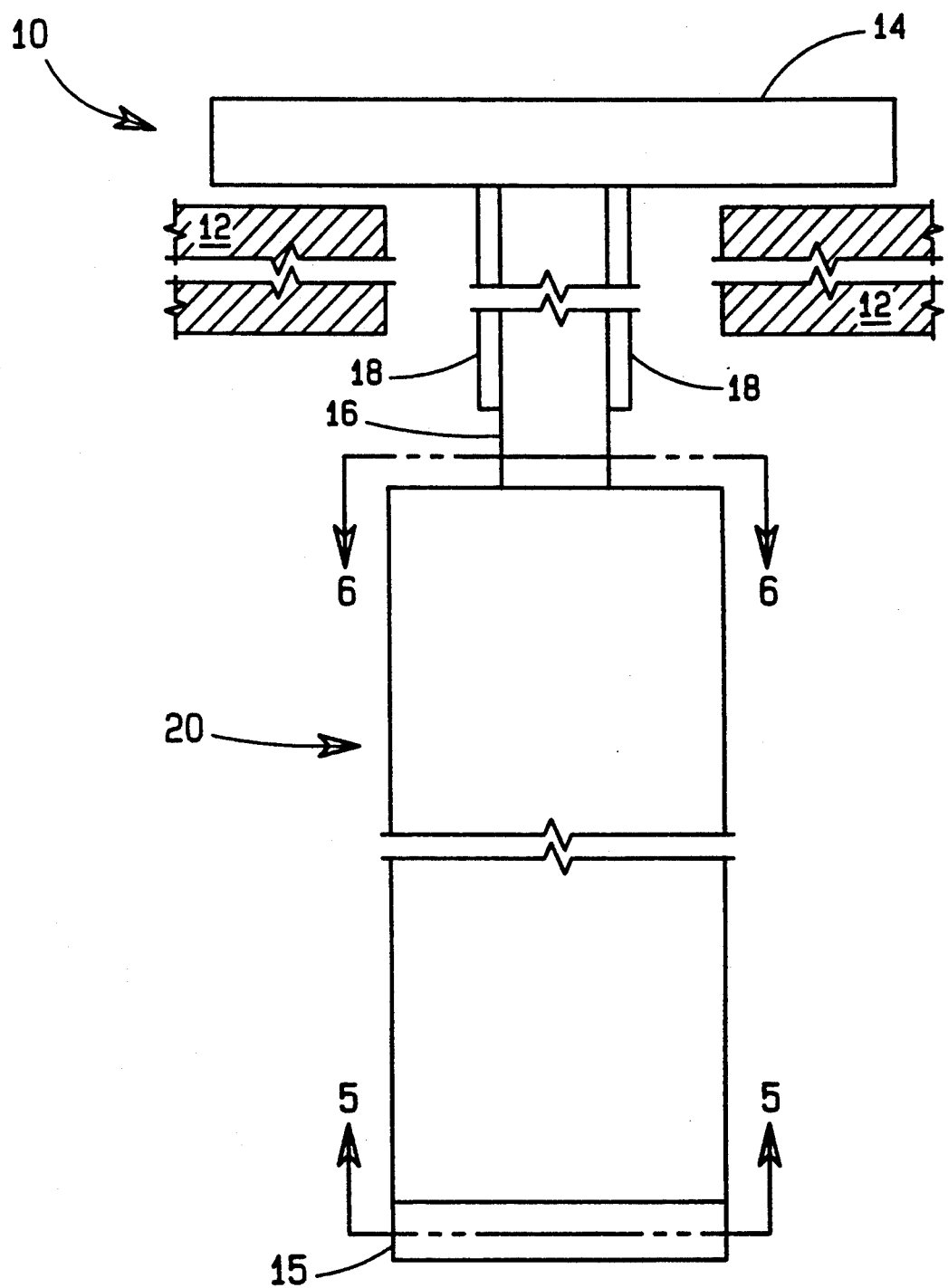
FIG. 1 shows a schematic representation of a simulated nuclear reactor fuel assembly in accordance with the present invention.

Referring to FIG. 1, there is shown a schematic representation of a simulated nuclear fuel assembly 10 in accordance with the present invention. The assembly 10 includes an experimental reactor vessel top head 12 which is connected to a support plate 14. The support plate 14 is connected to a power lead and heater support tube 16 which extends into a heater assembly 20. Adjacent to the heater support tube 16 are thermocouple guide tubes 18.

Figure 2:
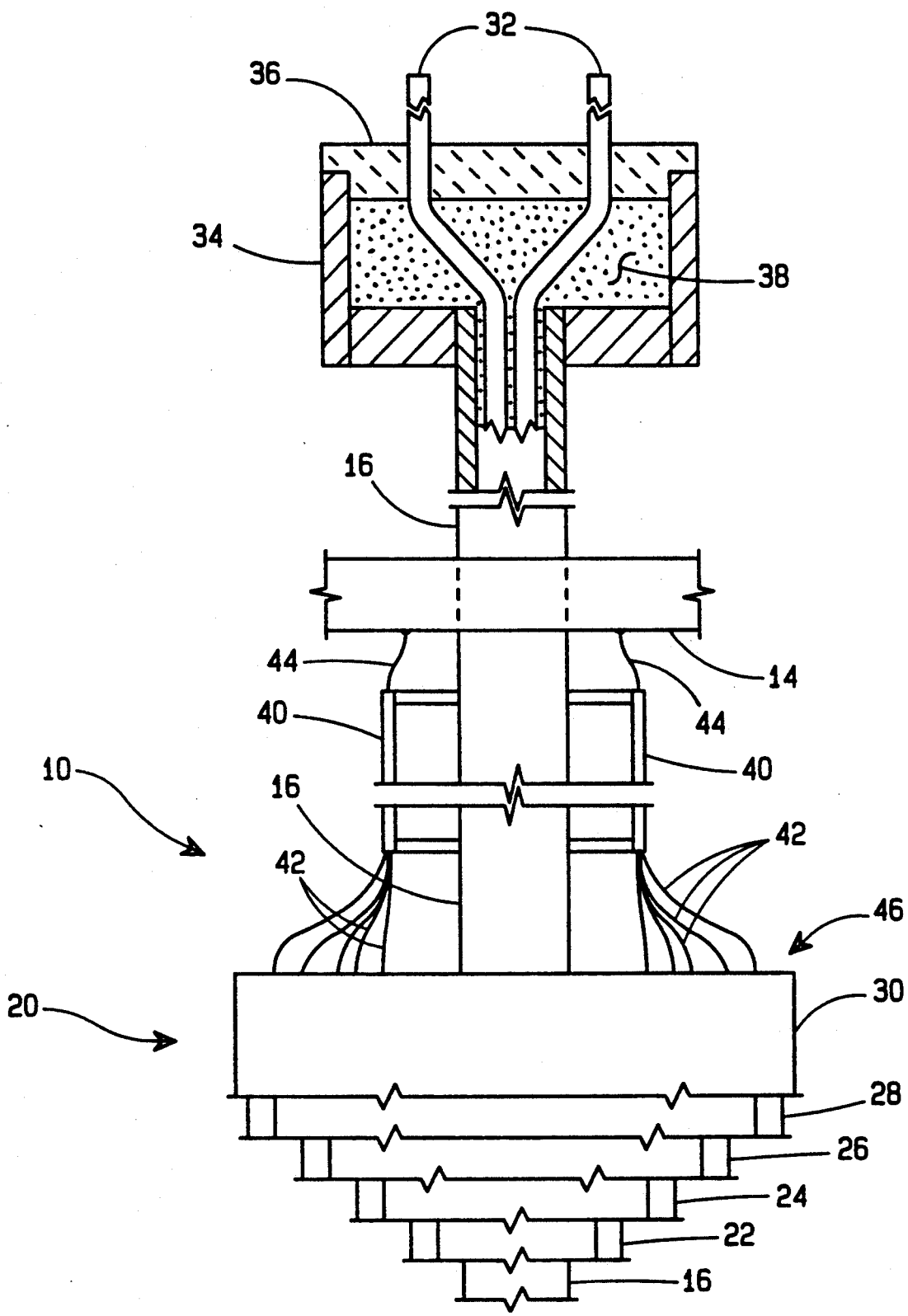
FIG. 2 shows a cross-sectional view of the simulated nuclear fuel assembly of FIG. 1.

A sectional view of the simulated nuclear fuel assembly 10 is shown in FIG. 2. It can be seen that the heater assembly 20 includes a plurality of concentric heater tubes. These heater tubes simulate the fuel tubes in a nuclear reactor and include an inner target tube 22, which is unheated, an inner heater tube 24, a middle heater tube 26, and an outer heater tube 28. Surrounding the target tube 22 and the heater tubes 25, 26, and 28 is an outer target tube 30, which is unheated. The outer target tube 30 can also be considered the housing for the heater assembly 20. The power lead and heater support tube 16 is connected to the heater assembly 20 by its connection with the inner target tube 22, and extends into the heater assembly 20 from the top 46 and the entire length thereof.

More detailed views of the design of a representative heater tube 24, 26, or 28 is shown by FIGS. 3 and 4. For purposes of this description, the electrical conductor in heater tube 24, 26 and 28 are represented by the item number 50, it being understood that the conductor 50 shown in FIG. 3 is typical of any of the conductors in tubes 24, 26 or 28. The concept of the present invention is to split the conductor elements into two halves such as two semicircular halves of a tube or rod. Alternately, and as seen in FIG. 3, the electrical conductor 50 can include elongated slots 52 extending from one end almost substantially the entire length thereof such that each tube is joined at one end and is not joined at the other end. The conductor elements are joined at the top end by welding or brazing. The elongated slots 52 are filled with an electrical insulating ceramic such as alumina.

A cross-sectional view of the typical heater tube 50 is shown in FIG. 4, taken from the line 4—4 in FIG. 3. The line "I" represents the heater tube inside surface and the line "O" represents the heater tube outside surface. From the line "I", the tube includes a base tube 56 of aluminum. Adjacent to the base tube 56 is a first ceramic insulating layer 58 deposited by thermal spraying. An electrical conductor element 50 is next to the first insulating layer 56 and is deposited by thermal spraying. The conductor element 50 is preferably a Ni-Al alloy. The thickness of the Ni-Al layer 50 varies, increasing from about 0.005 inches at midplane to about 0.06 inches at both ends. A second ceramic insulating layer 60 is adjacent to the conductor element 50 and is deposited by thermal spraying. The second insulating layer 60 is then covered with an aluminum layer 62 at the heater tube outside surface "O", deposited by thermal spraying. Insulating layers 58 and 60 are preferably a ceramic such as alumina. The ceramic layers 58 and 60 vary in thickness as a function of elevation to offset the variation in the thickness of the conductor element 50.

Also shown in FIG. 4 are typical thermocouple notches 64 and 66. The notches 64 and 66 are machined into layers 56 and 62 into which thermocouples 42 are press fitted. Once the thermocouples are fitted into the notches, the notches are filled with an aluminum spray layer 68 identical to the aluminum thermal spray layer 62.

Referring again to FIG. 2, a pair of power leads 32 for supplying heat to the assembly 20 are shown. The power leads 32 are copper rods, of about 0.2 inches in diameter and about three feet in length. They are housed at the top of the assembly 10 above the support plate 14 in a housing 34 which is a cylindrical unit having aluminum sides and a nonconductive, machinable ceramic top 36, such as the ceramic sold under the trademark MACOR. An alumina paste 38 fills the housing to provide for electrical insulation. The power leads 32 project outward from the housing 34 to provide for connection to a power source. The power leads 32 then extend downward from the housing 34 through the heater support tube 16 and into the open top of the heater assembly 20 where they are connected to the heater elements 24, 26, and 28 through electrical circuitry, the details of which are shown in FIG. 5.

Figure 5:
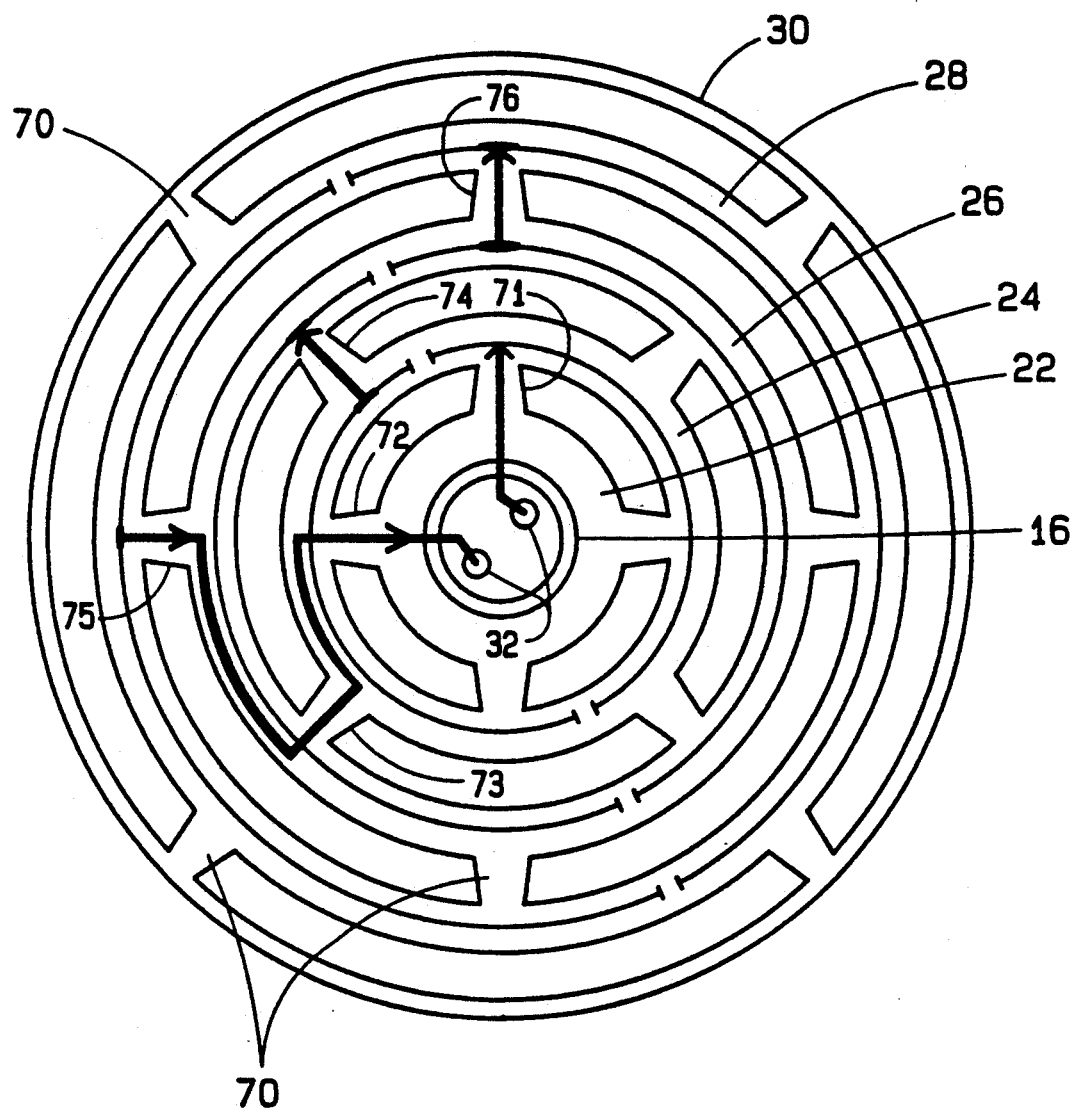
FIG. 5 shows a schematic view of the concentric heater tube assembly taken from the line 5—5 of FIG. 1 through a bottom end cap, looking upward from the bottom.

Referring to FIG. 5, there is shown a schematic view of the concentric heater tube assembly 20 taken from the line 5—5 of FIG. 1 through a bottom end cap 15, looking upward from the bottom. This view shows that the conductor layer in each heater tube 24, 26, and 28 is split into two halves. A plurality of ribs, generally denoted 70, are provided in the annular spaces between the tubes. These ribs, preferably of aluminum to match the aluminum of the inner target tube 22 and heater tubes 24, 26, and 28, insure separation of the tubes to prevent them from coming into contact with each other. They are symmetrically arranged and essentially divide each tube into four quadrants. Although FIG. 5 does not show a discernible separation of the ribs from the next outer tubes 24, 26, 28, and 30, it should be understood that this separation provides an extremely small clearance between the ribs and tubes of only about 0.030 inches. There are four ribs provided for each tube, and each rib extends along the full length of the tubes. In the bottom end cap, the ribs and tubes form a single solid construction.

Also shown in FIG. 5 are electrical circuit paths between the heater tubes, represented by heavy arrowed lines. This circuit is routed through the end cap 15 at the bottom of the heater assembly 20. Routing of the electrical circuit from the power leads 32 is accomplished through certain of the ribs. More specifically, the electrical circuit is shown routed from the inner target tube 22 to the inner fuel tube 24 through the rib 71. The circuit is also routed from the inner target tube 22 to the inner fuel tube 24 to the middle tube 26 through ribs 71 and 74; and from the middle fuel tube 26 to the outer fuel tube 28 through ribs 74 and 76. The electrical return from the outer fuel tube 28 to the inner target tube 22 is through ribs 75, 73, and 72. The two fuel tubes between the outer fuel tube 28 and the inner target tube 22 (the middle 26 and inner 24 tubes) are not connected to the return circuitry. The conductor elements in heater tubes 24, 26, and 28 are joined at the top of the assembly 20 as shown in FIG. 3 to complete the electrical circuit inside each heater tube.

Attached to the power lead and heater support assembly 16 are thermocouple guide tubes 40. These tubes serve to route a multiplicity of thermocouples from thermocouple grids 44 located on the underside of the support plate 14, to various locations on the fuel tubes 24, 26, and 28.

Figure 6:
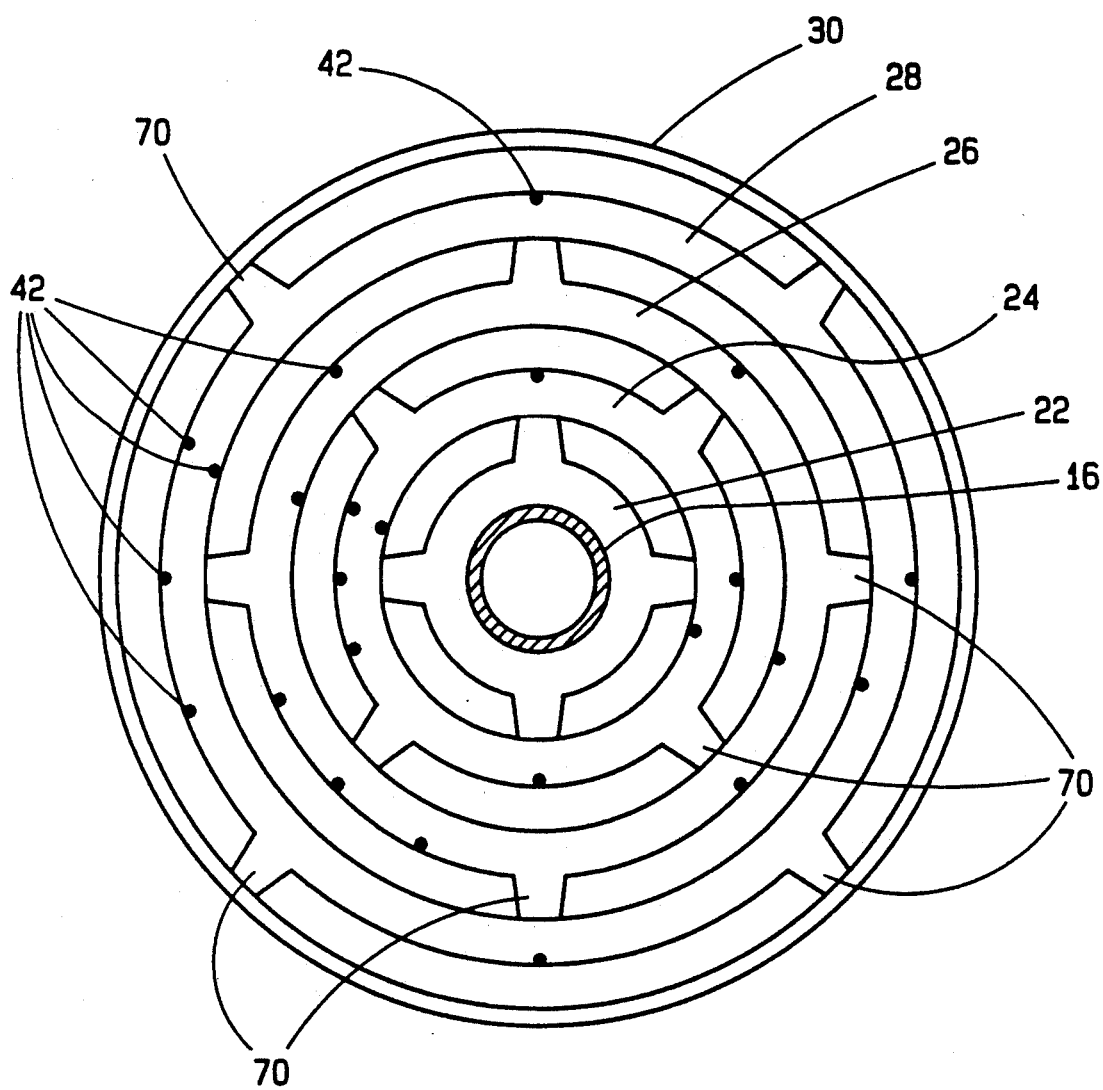
FIG. 6 shows a view of the heater tube assembly taken from the line 6—6 of FIG. 1, looking downward from the top.

Referring to FIG. 6, there is shown a view of the heater tube assembly 20 taken from the line 6—6 of FIG. 1, looking downward from the top. It can be seen in this figure that the ribs contact the next outer tubes; however, in reality there is a separation of about 0.030 inches between the ribs and the next outer tubes.

FIG. 6 also shows the radial locations of the various thermocouples 42 on the heater tubes 24, 26, and 28. Each of the heater tubes includes eight thermocouples. As shown, each heater tube has three thermocouples symmetrically located on the outer surface of the tube between two of the ribs 70; one thermocouple on the outer surface of the tube centered between two ribs in each of the other three quadrants; and two thermocouples on the inside surface about one hundred eighty degrees apart. Different numbers and other radial locations of the thermocouples are of course possible, provided that the arrangement provides an accurate measurement of the heat dissipated throughout the assembly. A coolant such as water is provided in the annular spaces between the tubes to remove heat from the tube surfaces. A sufficient number of thermocouples must be installed on all heater surfaces to indicate the onset of sustained dryout. A dryout would occur when the water coolant in the annular spaces between the tubes boils in the regions where the thermocouples are located. This would indicate that too much heat is being transferred such that the coolant reaches the boiling point, and the fuel tubes would go on an uncontrolled heat build-up. This then defines an accident situation corresponding to a critical situation in an actual nuclear reactor.

Additionally, the elevational location of these thermocouples can vary depending on the requirements of the guiding experimental program utilizing the heater assembly. For purposes of example, the locations of the thermocouples are at elevations in the range of 11 to 23 inches along the heater tubes with most of the thermocouples located somewhat near the top of the assembly. In this example, the guiding experimental program causes dryout near the top of the heater assembly.

In operation, when power is applied, electrical resistance heating occurs. The electrical circuit transmits electrical energy to each successive concentric heater tube through the end piece 15 at the bottom of the assembly 20. This electrical power is related to the amount of nuclear fission produced in a reactor. The split heater concept of the present invention allows full scale geometry and power profile simulation of nuclear fuel assemblies, as well as for simulations where access is available from one direction only.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described to best explain the principles of the invention and its practical application and thereby enable others skilled in the art to best utilize the invention in various embodiments and with various modifications as are suited to the particular use contemplated. It is intended that the scope of the invention be defined by the claims appended hereto.

The embodiments of the invention in which exclusive property rights or privileges are claimed are defined as follows:

1. A simulated nuclear reactor fuel assembly comprising:
    a heater assembly having a top end and a bottom end and including a plurality of concentric heater tubes having electrical circuitry connected to a power source, the heater tubes being radially spaced from each other;
    an outer target tube and an inner target tube concentric with the heater tubes and with each other, the outer target tube surrounding and radially spaced from the heater tubes, and the inner target tube surrounded by and radially spaced from the heater tubes and outer target tube;
    and further wherein the top of the assembly is generally open to allow for the electrical power connection to the heater tubes and the bottom end of the assembly includes means for completing the electrical circuitry in the heater tubes to provide electrical resistance heating to simulate the power profile in a nuclear reactor.

2. The simulated fuel assembly of claim 1 wherein the heater tubes are aluminum, and each tube is connected to the power source by an embedded coating of an electrically conductive layer along the length of the tube, and further wherein the conductive layer is surrounded by first and second ceramic insulating layers, and the second ceramic insulating layer is coated with an aluminum spray layer.

3. The simulated fuel assembly of claim 2 wherein each heater tube includes two semicircular elements longitudinally isolated from each other by an electrical insulating ceramic extending substantially along the entire length of the tube but not the full length thereof, such that each tube is joined at one end and is not joined at the other end.

4. The simulated fuel assembly of claim 3 wherein each heater tube includes a multiplicity of thermocouples embedded at various locations within the heater tubes.

* * * * *